Nov. 23, 1965    A. Z. HALLUM    3,218,973
MISSILE COMPONENT SEPARATION ASSEMBLY
Filed Sept. 25, 1962    2 Sheets-Sheet 2
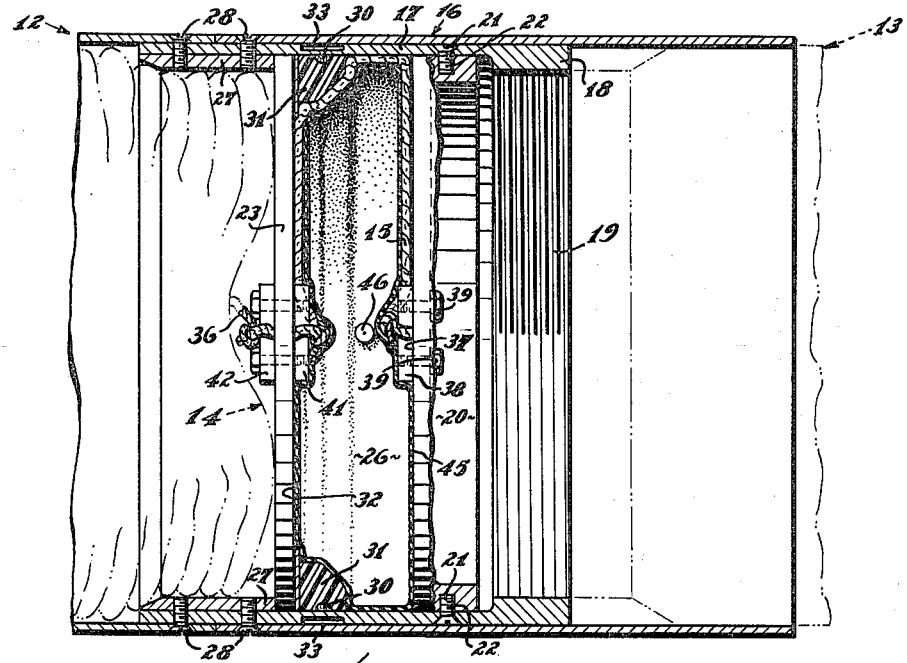
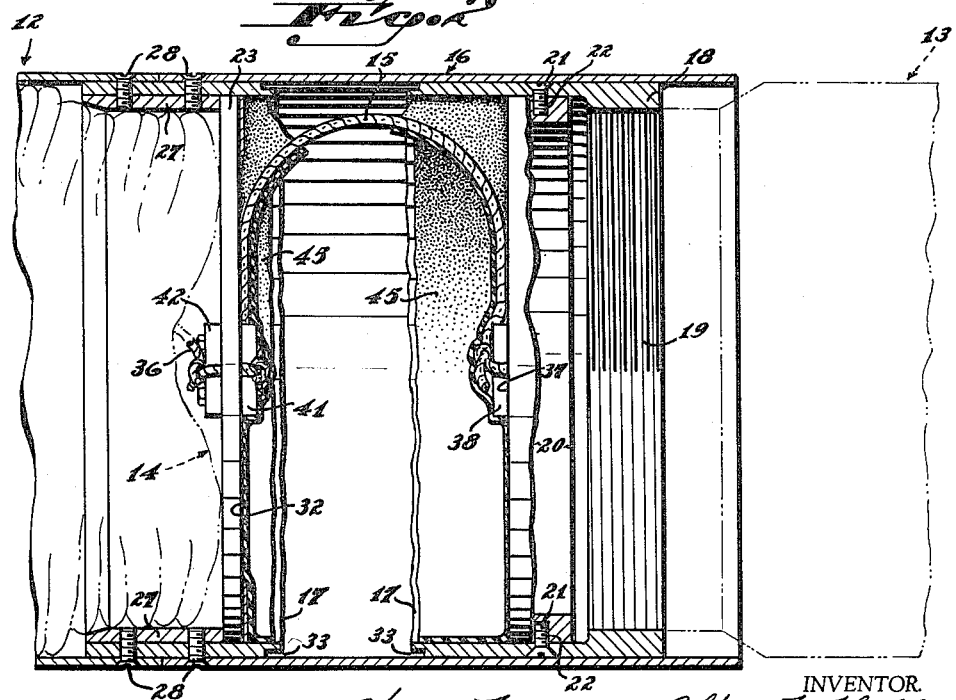
INVENTOR.
Alton Z. Hallum
BY
Wood, Herron & Evans
ATTORNEYS

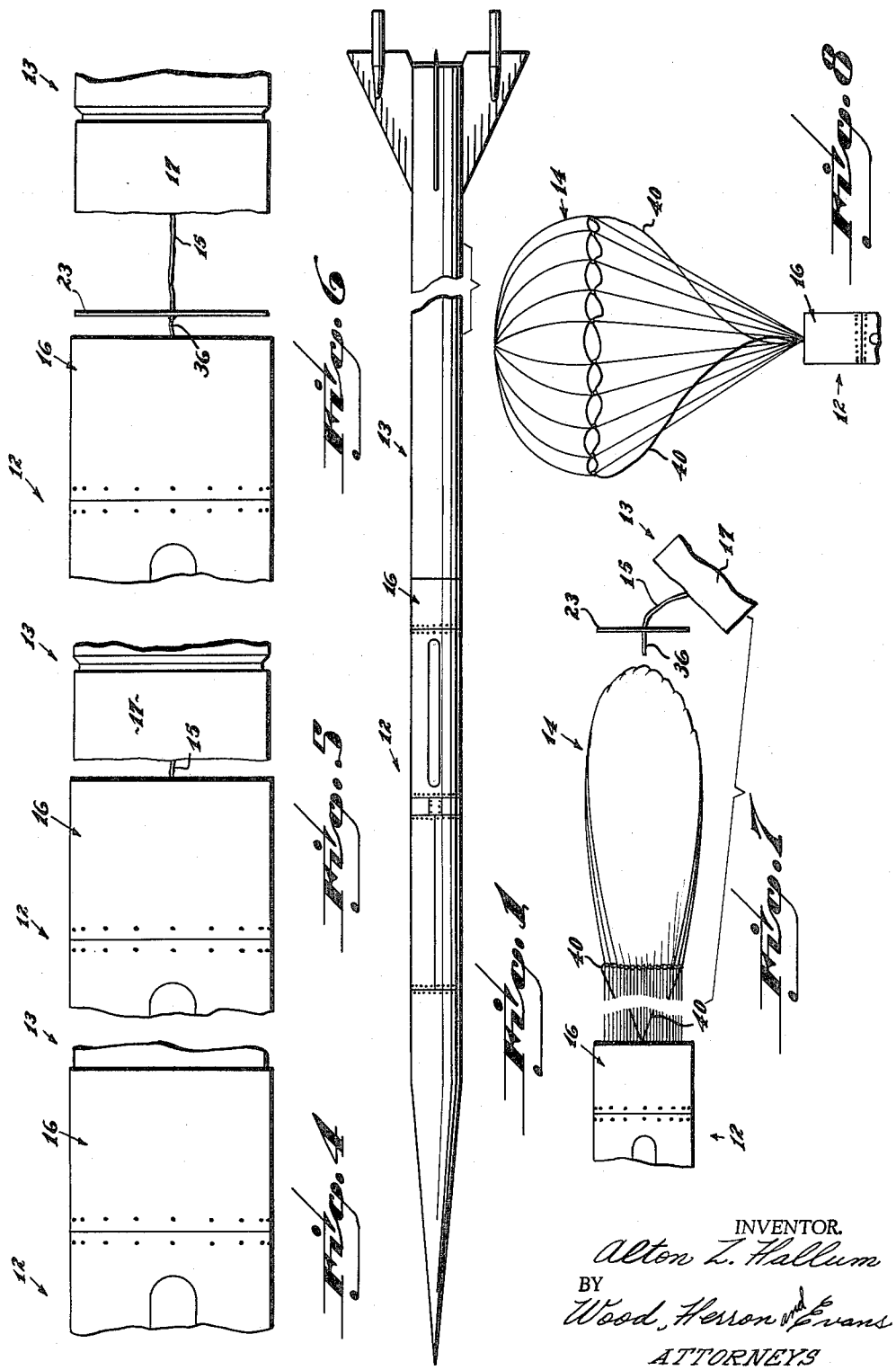

United States Patent Office 3,218,973
Patented Nov. 23, 1965

3,218,973
MISSILE COMPONENT SEPARATION ASSEMBLY
Alton Z. Hallum, Cleveland, Ohio, assignor to Aeronca Manufacturing Corporation, Middletown, Ohio, a corporation of Ohio
Filed Sept. 25, 1962, Ser. No. 226,108
6 Claims. (Cl. 102—49)

This invention relates to separation assemblies and more particularly to a missile section separation assembly.

Missiles are conventionally made from a plurality of sections which are designed so as to be separable during the missile flight at predetermined points in the flight path. For example the booster or motor section of the missile is usually separated from the remaining portion of the missile during the flight and after the propellant in the booster section has been expended.

The separation assembly of this invention has utility in numerous separable combinations although it is primarily intended for use in target or research missiles. This type of missile is presently being utilized for high altitude targets or to collect high altitude atmospheric data. They are commonly made from two parts which include a forebody section and an afterbody or booster section. Near the apex of the missile's trajectory, the forebody and booster sections are separated and a parachute is deployed. The parachute functions to support the missile as it falls slowly through the target area or while it collects atmospheric data and relays that information electronically to the ground.

A principal objective of this invention has been to provide a relatively uncomplicated and inexpensive separation assembly for positively and efficiently separating plural sections of a component system such as a missile system.

More particularly, it has been an objective of this invention to provide a missile separation assembly in which the speed of separation of the missile components may be easily altered or changed in accordance with specification requirements for a particular missile. In this connection it is important to note that the acceleration rate caused by the missile separation force must be maintained within predetermined limits so as to avoid damage to the electrical componentry or other equipment within the missile while still functioning to rapidly separate the sections. Therefore, it has been an objective of this invention to provide a missile separation assembly in which the accelerating force generated by a standard size separation device may be easily varied within a wide range so as to provide a given separation acceleration even though the weight of the forebody or other variables may be altered from one flight to another or from one missile to another.

Very briefly, the separation assembly of this invention includes telescopically received portions of the forebody and booster sections which cooperate to form a piston and cylinder arrangement. Acting between the forebody and booster sections is a pressurized bladder which upon release of the connection between the two telescoping sections of the missile, provides a separating force to move the forebody section away from the booster section at a predetermined acceleration rate.

An important advantage inherent in this type of separation assembly is the fact that the separating force may be easily varied by merely altering the pressure within the pressurized bladder. Another advantage of this separation assembly is derived from the pressurized bladder acting between the forebody and booster sections so as to provide a low cost sealant and filler valve by means of which the bladder may be inflated to the correct pressure to achieve the desired separation force.

These and other objects and advantages of the present invention will be more readily apparent from a consideration of the following detailed description of the drawings illustrating a preferred embodiment of the invention.

In the drawings:

FIGURE 1 is a side elevational view of a missile in which the separation assembly of this invention is utilized, FIGURE 2 is a cross sectional view of the separation assembly portion of the missile prior to separation of the missile sections, FIGURE 3 is a cross sectional view of the separation assembly of the missile during separation of the component sections of the missile, FIGURES 4 through 8 are semi-diagrammatic views of the separation assembly portion of the missile during successive portions of the separation cycle.

Referring to FIGURE 1, a missile fitted with the separation assembly of this invention is essentially a two section missile comprising a forebody section 12 and a booster or motor section 13. The forebody section 12 is adapted to house electronic equipment such as measuring and transmitting equipment, radar tracking devices, etc. In addition, the forebody section 12 also houses a parachute indicated generally at 14. This parachute includes a canopy, the apex of which is releasably attached to the booster section 13 by means of a pull cord. The pull cord is adapted to break at a predetermined tension in response to the desired separation between the forebody and booster sections of the missile.

The forebody section 12 of the missile terminates in a sleeve portion 16 within which is mounted an inner sleeve 17. At the rearward end, the inner sleeve 17 is provided with an inwardly extending flange 18. The flange 18 has internal threads 19 adapted to receive the threaded forward section of the booster 13 of the missile.

A transversely extending rear reaction plate 20 is rigidly mounted within the inner sleeve 17 adjacent the flange 18. The rear reaction plate 20 is rigidly held in position near the rear of the inner sleeve 17 by means of a plurality of screws 21 which are countersunk into the inner sleeve 17 and threadably received in threaded recesses 22 in the peripheral portion of the rear reaction plate 20.

A forward reaction wall 23 extends transversely across the inner sleeve 17 forwardly of the rear reaction plate in such a manner as to provide a closed chamber 26 between the forward reaction wall 23 and the rear reaction plate 20. The forward reaction wall 23 is slidably mounted within the inner sleeve 17 and is held in fixed position against an annular abutment shoulder 27 mounted within the inner sleeve 17. Abutment shoulder 27 is held in fixed position by means of a plurality of countersunk screws 28 which extend through apertures in the wall of the forebody 12 and the inner sleeve 17 into threaded engagement with the abutment shoulder 27.

The separation assembly illustrated in this preferred embodiment includes an explosive charge 30 which when exploded will permit the rear reaction plate 20 to act as a piston and slide rearwardly relative to the forebody section of the missile carrying with it the booster section 13 of the missile. The annular explosive charge 30 is mounted within a peripheral recess in an annular matrix 31 of phenolic microballoons and thermo-setting plastic. This matrix 31 seats within the corner provided at the intersection of the rearward side 32 of the forward reaction wall 23 and the inner surface of the inner sleeve 17. Located immediately adjacent the explosive charge 30 in an annular groove 33 in the periphery of the inner sleeve 17. When the explosive charge 30 is ignited by means of a conventional electrical discharge or other actuating means, the explosive force is sufficient to part or fracture the inner sleeve 17 in the area where it is weakened by the groove 33. In this manner, the explosive charge 30 acts as a dissconnecting device by means of which the section of the inner sleeve 17 which extends forwardly of the groove 33 is separated from that portion of the inner sleeve 17 which extends rearwardly of the groove 33. When the inner sleeve 17 is fractured at this point, the rearwardly extending portion of the inner sleeve is free to slide backwardly within the sleeve portion 16 of the forebody 12.

In the illustrated embodiment of the invention, the booster section 13 of the missile is connected to the apex of a parachute canopy so that as the booster section is separated from the forebody of the missile, the parachute will be withdrawn in the reefed condition from the forebody section of the missile. To this end, a first cord 15 is used to interconnect the rear reaction plate to the forward reaction plate and a second cord 36 is used to interconnect the forward reaction plate to the apex of the parachute canopy. The first cord 15 is attached to the forward side 37 of the rear reaction plate by means of an anchor plate 38 which is attached to the forward wall 37 of the rear reaction plate by means of a plurality of screws 39 extending through apertures in the rear reaction wall 20 into threaded engagement with the anchor plate 38. The surface of the anchor plate 38 which abuts the rear reaction plate is provided with a recess through which the cord 15 extends and is tied at one end. The opposite end of this cord is attached to the rear surface 32 of the forward reaction wall 23 in a similar manner by means of an anchor plate 41 having a similar recess through which the cord may be threaded and tied. The second cord 36 is attached to the forward surface of the forward reaction wall 23 by a similar anchor plate 42 to which one end of the cord 36 is tied. The opposite end of the cord 36 is attached to the apex of the canopy of the parachute 14.

The force to separate the forebody and booster sections of the missile is provided by a pressurized gas within the chamber 26. This chamber is lined with a rubber or elastomeric bladder 45 which acts as a sealant and is equipped with a conventional valve 46 through which a gas such as air under pressure may be inserted into the chamber. By varying the pressure within the bladder, the separating force between the booster and forebody sections of the missile may be varied within predetermined limits so as to provide the required separation force to obtain a prescribed acceleration rate.

The operation of the separation assembly should now be readily obvious. Referring to FIGURES 3 through 8, it will be seen that upon detonation of the annular explosive charge 30, the explosive charge 30 fractures the inner sleeve 17 in the weakened area provided by the groove 33. With the forward and rearward portions of the inner sleeve 17 separated, the pressure in the bladder 45 acts upon the rear reaction plate to force the rear reaction plate and rearward portion of the inner sleeve to slide rearwardly relative to the forward reaction wall 23. At this time the rear reaction plate is acting as a piston within the cylinder provided by the sleeve portion 16 of the forebody 12. Since the booster section 13 of the missile is threaded into the flange 18 on the rearward portion of the inner sleeve, the booster section of the missile moves rearwardly relative to the forebody and falls free of the forebody section of the missile as the rear reaction plate 20 is forced out of the sleeve portion 16 of the missile. Since the rear reaction plate is attached to the forward reaction wall 23 by means of cord 15 and the forward reaction wall is slidably mounted within the inner sleeve 17, the forward reaction wall is withdrawn from the forebody section as illustrated in FIGURES 6 and 7. As the booster and forebody sections of the missile are separated, the parachute 14 within the forebody section is pulled from the forebody section in the reefed condition by means of cord 36 which is connected between the apex of the parachute canopy and the forward reaction wall 23. The parachute at this time is held in a reefed condition. When the booster and forebody sections of the missile have been separated and the tension on the cord 36 between the reaction plate and the parachute exceeds the strength of the cord, cord 36 is broken. Subsequently, the parachute is deployed by severing its reefing lines 40 by means of conventional squibs (not shown) carried in the forebody section of the missile.

From the foregoing disclosure of the general principles of the present invention and the above detailed description of the preferred embodiment, those skilled in the art will readily comprehend various modifications to which the invention is susceptible. Accordingly, I desired to be limited only by the scope of the appended claims.

Having described my invention, I claim:

1. A missile comprising two sections adapted to be separated during a flight, one of said sections having a portion telescopically mounted within a portion of the second section, said telescopically mounted portions defining therebetween a closed chamber, a bladder located within said chamber, said bladder containing a prepressurized gaseous fluid therein operable to cause said sections to be separated with a predetermined separation force, and means for releasably securing said first section of said missile to said second section whereby upon release of said securing means said prepressurized gaseous fluid will force said one section away from said second section at a rate determined by the pressure of said gaseous fluid within said bladder.

2. A missile comprising two sections adapted to be separated during a flight, one of said sections having a portion telescopically mounted within a portion of the second section, said telescopically mounted portions having end walls defining therebetween a closed chamber, a bladder mounted within said chamber, said bladder containing a prepressurized gaseous fluid therein operable to cause said sections to be separated with a predetermined separation force, and means for releasably securing said first section of said missile to said second section whereby upon release of said securing means said prepressurized gaseous fluid will force said one section end wall to act as a piston and move away from said second section at a rate determined by the pressure of said gaseous fluid within said closed chamber.

3. A missile comprising two sections adapted to be separated during a flight, one of said sections having a portion including an end wall telescopically mounted within a portion of the second section, said telescopically mounted portions defining therebetween a closed chamber, a bladder mounted within said chamber, said bladder containing a prepressurized gaseous fluid therein operable to cause said sections to be separated with a predetermined separation force, and means for releasably securing said first section of said missile to said second section whereby upon release of said securing means said prepressurized gaseous fluid within said bladder will force said end wall to act as a piston within said second section and move away from said second section at a controlled rate determined by the pressure of said gaseous fluid within said bladder.

4. A separation assembly for separating a booster section of a missile from a forebody section at a predetermined point in the flight path of the missile, said assembly comprising a sleeve adapted to be mounted and securely fastened with a rearwardly extending tubular portion of said forebody section, means at the rearward end of said sleeve for rigidly connecting the booster section of said missile to said sleeve, a pair of transverse walls extending across said sleeve and defining therebetween a closed chamber, a bladder within said chamber, said bladder containing a prepressurized gaseous fluid therein operable to cause said sections to be separated with a predetermined separation force, and explosive means for severing the wall of said sleeve whereupon said prepressurized gaseous fluid will force said forebody section to separate from said booster section at a rate determined by the pressure of said gaseous fluid within said chamber.

5. A missile comprising a forebody section and a booster section, a parachute within said forebody section, said booster section having a portion telescopically mounted within a portion of the forebody section, said telescopically mounted portions defining therebetween a closed chamber, a bladder mounted within said chamber, said bladder containing a prepressurized gaseous fluid therein operable to cause said sections to be separated with a predetermined separation force, means for connecting said parachute to said booster section, and explosive means for disconnecting said forebody section of said missile from said booster section whereby upon actuation of said disconnecting means said prepressurized gaseous fluid within said bladder will force said forebody section away from said booster section at a rate determined by the pressure of said gaseous fluid within said bladder and thereby withdraw said parachute from said forebody section.

6. A missile comprising a first section and a second section, a parachute mounted within said first section, one of said sections having a portion telescopically mounted within a portion of the other section, said telescopically mounted portions defining therebetween a closed chamber, a bladder mounted within said chamber, said bladder containing a prepressurized gaseous fluid therein operable to cause said sections to be separated with a predetermined separation force, means for connecting said parachute to said second section, and explosive means for disconnecting said forebody section of said missile from said booster section whereby upon actuation of said disconnecting means said prepressurized gaseous fluid will force said first section away from said second section at a rate determined by the pressure of said gaseous fluid within said bladder and thereby withdraw said parachute from said first section.

References Cited by the Examiner
UNITED STATES PATENTS

| | | | |
|---|---|---|---|
| 2,503,269 | 4/1950 | Hickman | 102—49 |
| 2,564,209 | 8/1951 | Murphy | 89—1 |
| 3,026,772 | 3/1962 | Moreland | 102—49 |
| 3,101,052 | 8/1963 | Webster et al. | 102—49 |

OTHER REFERENCES

Astronautics, Dec. 1958, vol. 3, No. 12, "Space Beacon," page 21 required.

BENJAMIN A. BORCHELT, *Primary Examiner.*

SAMUEL FEINBERG, *Examiner.*